United States Patent [19]

Malone

[11] Patent Number: 5,112,528
[45] Date of Patent: May 12, 1992

[54] ANTISTATIC POLYOLEFIN FOAMS AND FILMS AND METHOD OF MAKING THE FOAM AND ANTISTATIC COMPOSITION

[75] Inventor: Bruce A. Malone, Granville, Ohio

[73] Assignee: The Dow Chemical Company, Midland, Mich.

[21] Appl. No.: 782,925

[22] Filed: Oct. 25, 1991

Related U.S. Application Data

[62] Division of Ser. No. 735,135, Sep. 16, 1991.

[51] Int. Cl.$^5$ .......................... H01B 1/00; C08K 5/16
[52] U.S. Cl. .................................... 252/500; 252/8.8; 252/1; 252/182.11; 252/511; 524/186; 524/322; 524/585
[58] Field of Search ...................... 252/1, 8.8, 182.11, 252/500, 511; 524/186, 322, 585

[56] References Cited

U.S. PATENT DOCUMENTS

| | | | |
|---|---|---|---|
| 3,789,028 | 1/1974 | Heiskel et al. | 521/57 |
| 4,369,227 | 1/1983 | Hahn et al. | 521/57 |
| 4,429,058 | 1/1984 | Schawarz | 521/57 |
| 4,438,058 | 3/1984 | Tanaka | 521/57 |
| 4,495,224 | 1/1985 | Rigler et al. | 521/57 |
| 4,628,068 | 12/1986 | Kesling et al. | 521/57 |
| 4,781,983 | 11/1988 | Stickley | 521/57 |
| 4,808,448 | 2/1989 | Cox | 521/57 |

*Primary Examiner*—Morton Foelak

[57] ABSTRACT

Polyolefin foams and films having improved electrostatic properties are provided by incorporating into the polyolefin foam or film a novel antistatic additive composition comprising 0.1 to 10 parts per hundred based on the weight of the olefin polymer of a quaternary ammonium salt and 0.1 to 10 parts per hundred based on the weight of the olefin polymer of a partial ester of a long-chain acid with a polyol. A method of making the foam containing the novel antistatic additive composition is also disclosed.

6 Claims, No Drawings

— 1 —

ANTISTATIC POLYOLEFIN FOAMS AND FILMS AND METHOD OF MAKING THE FOAM AND ANTISTATIC COMPOSITION

CROSS-REFERENCE TO RELATED APPLICATION

This is a divisional of application Ser. No. 07/735,135 filed Sep. 16, 1991.

BACKGROUND OF THE INVENTION

1. Field of the Invention

This invention relates to polyolefin foams and films exhibiting enhanced antistatic properties, that is, foams and films which rapidly dissipate electrostatic charges and exhibit a reduced tendency to accumulate electrostatic charges. The polyolefin foams may be open or closed cell and are produced by known extrusion methods with foaming caused by known physical or chemical blowing agents. This invention also relates to the antistatic composition which causes the enhanced antistatic properties and the method of making the enhanced antistatic polyolefin foam.

2. Description of Related Art

Polyolefin foams, like almost all other synthetic polymeric materials, tend to acquire and accumulate electrostatic charges. For many applications it is desirable, if not essential, to have a foam material which either does not acquire an electrostatic charge, or which dissipates it rapidly.

Accumulation of electrostatic changes on all types of polymeric materials has been a long-standing problem, and a variety of techniques have been proposed to alleviate the problem. For example, compounds which migrate to the surface of the plastic or fiber have been incorporated in the composition to modify its electrical properties. Antistatic resins have been copolymerized with the base polymer in an effort to provide improved properties. Other antistatic compounds, such as quaternary (quatenary) ammonium salts, have been applied topically, i.e., by impregnation, or incorporated directly into the polymeric materials to provide a finished, or semi-finished product with improved antistatic properties.

There are several types of chemical antistatic compounds generally available. These include: cationic compounds, such as long-chain (those generally having about 4-22 carbon atoms) quaternary ammonium, phosphonium or sulfonium salts with, for example, chloride counter ions; anionic compounds, such as alkali salts or alkyl sulphonic, phosphinic, dithiocarbamic, or carboxylic acids; and nonionic compounds, such as ethoxylated fatty amines, fatty acid esters, ethanolamides, polyethylene glycol-esters, polyethylene glycol-ethers, and mono- and di-glycerides.

For example, U.S. Pat. No. 3,117,113 with a priority filing data in 1957, discloses the use, in combination with PVC (polyvinyl chloride resin), of quaternary ammonium compounds of the general class found useful in this invention. U.S. Pat. Nos. 3,335,123 and 3,407,187 disclose the use of quaternary ammonium compounds which are physically incorporated into polyolefins, PVC and other polymers, as by milling.

It is also known that certain quaternary ammonium salts can be added during the manufacture of polyurethane foam to impart improved antistatic properties to the cured foam. U.S. Pat. No. 3,933,697 discloses specific quaternary ammonium salts that can be incorporated as an ingredient into the composition prior to commencement of the foam-forming reaction; alternatively, it is suggested that the same compounds can be applied by impregnation of the finished urethane foam. U.S. Pat. No. 4,605,684 discloses the introduction of an antistatic additive composition prior to polymer formation of specific quaternary ammonium compounds and specific plasticizer compounds into a reaction mixture to form an antistatic polyurethane foam.

Polyolefin foam can be provided with antistatic properties by one of two methods: (1) extrusion production of an antistatic foam that has uniform properties throughout its volume and cross-section; and (2) post-treatment methods in which an antistatic composition is impregnated on the surface and, to the extent possible, throughout the interior structure of the foam product. The latter technique is the less preferable since it requires repeated handling and treatment of material thereby increasing its cost; it provides less uniform properties, which properties may indeed be only superficial if the thickness of the foam material is substantial; and the impregnant is subject to removal by wear and tear if the impregnated product is used over again. If used for packing sensitive electronic components, such as computer chips, the impregnated composition may attach to, and damage the article. Of course, in some applications such as laundry softeners or antistatic agents, it is intended that the impregnated foam lose its antistatic coating as it is transferred to the damp laundry during use in the dryer. However, in most applications it is desirable for the foam product to exhibit both permanent and uniform antistatic properties.

While the advantages of incorporating an additive by the extrusion method which will render the finished product antistatic are obvious, the selection of appropriate materials must be based upon their compatibility in the foam making process, and on their effect on the physical appearance and characteristics of finished foam product. The extrusion and expansion of the foam-forming ingredients must provide a uniform cell structure, the avoidance of splits, cracks and other defects, and finally a self-sustaining and stable extruded foam structure. The presence of even small quantities of additional compounds can have a markedly adverse effect on the extrusion and expansion mechanism of the finished product. Those familiar with the art will know of the adverse effects of low levels of contaminants or impurities which may be barely detectable.

Catonic compounds, such as quaternary ammonium salts, are known to affect the thermal stability of certain plastics, such as styrenics and hard PVC, when incorporated into those plastics.

It is therefore essential in seeking an agent or additive which will render the finished polyolefin foam antistatic, to find a compound or composition that is compatible with the foam making process. Other factors which must be taken into account are (1) the ability to mechanically incorporate the antistatic additive into the foam-forming composition using conventional equipment; and (2) the cost of the additive at its effective level or within its effective range and its impact on the final cost of the foam.

SUMMARY OF THE INVENTION

It has now been found in the present invention that quaternary ammonium salts, when combined with one or more partial esters of a long-chain fatty acid with a polyol provide an improved antistatic additive composition and that this antistatic additive composition can be incorporated into polyolefin products, including foam and film, to provide remarkably improved antistatic properties in the finished foam product. Also, another aspect of the present invention is that the quaternary ammonium salt compound must be either melted or in solution and the compound must be added after the polyolefin is heat plastified to become a flowable gel.

Most significant is the discovery that a quaternary ammonium salts, when used together with a partial ester of a long-chain fatty acid with a polyol to provide an antistatic additive composition, exhibit a synergistic effect. This effect occurs both when this antistatic additive composition is added to either polyolefin foam-forming reactants or film-forming reactants. The antistatic additive composition provides finished products, including foam and film, having greatly improved antistatic properties. This synergism is demonstrated by the fact that significant improvement of antistatic properties in the finished products foam are observed when both compounds of the antistatic additive composition are used, as opposed to just either compound by itself.

The quaternary ammonium compounds and partial esters of a long-chain fatty acid with a polyol that comprise the antistatic additive composition found to produce this synergistic result in the practice of this invention are those generally available as commercial products.

DESCRIPTION OF ILLUSTRATIVE EMBODIMENTS

Polyolefin resins suitable for use in the practice of the present invention include ethylene homopolymers such as low, medium, or high density polyethylene, and ethylene copolymers such as ethylene-vinyl acetate copolymers, ethylene-propylene copolymers, ethylene-1-butene copolymers, ethylene-butadiene copolymers, ethylene-vinyl chloride copolymers, ethylene-methyl methacrylate copolymers, ethylene-acrylonitrile copolymers, ethylene-acrylic acid copolymers, ethylene/carbon monoxide copolymers, and the like. As the polyolefin resin, it is preferable to use an ethylene homopolymer or a copolymer having an ethylene content above 50 percent by weight, preferably above 75 percent by weight. Additionally, blends of two or more of such olefin polymer resins can also be suitably employed in the practice of the present invention.

If the polyolefin resins listed previously do not appear to work with the antistatic additive composition of the present invention, the inclusion of a strong hydrogen bonding group, either as a comonomer (such as for example, carbon monoxide or acrylic acid) in the polymerized olefin resin, or the physical blending into the polyolefin resin of a compatible resin having the strong hydrogen bonding group, such as for example, a resin of ethylene and acrylic acid (3 percent by weight acrylic acid) or a resin of ethylene and carbon monoxide (10 percent by weight carbon monoxide) will cause the polyolefin resin with the antistatic additive composition to exhibit an faster static decay time.

Particularly preferred thermoplastic polyolefin resin compositions include copolymers of ethylene and a copolymerizable polar monomer especially a carboxyl-containing comonomer. Examples include copolymers of ethylene and acrylic acid or methacrylic acid and $C_{1-4}$ (1-4 carbon atom containing) alkyl ester or ionomeric derivatives thereof; ethylene vinyl-acetate copolymers; ethylene/carbon monoxide copolymers; anhydride containing olefin copolymers of a diene and a polymerizable; copolymers of ethylene and an alpha-olefin having ultra low molecular weight (i.e. densities less than 0.92); blends of all of the foregoing resins; blends thereof with polyethylene (high, intermediate or low density); etc.

The most preferred thermoplastic compositions are copolymers of ethylene and acrylic acid having up to about 30 percent by weight of copolymerized acrylic acid and ionomeric derivatives of the foregoing.

The polymers to be foamed may also be mixed with various additives as required, such as known chemical and physical blowing agents, known nucleating (or cell-size controlling) agents (e.g., talc, clay, mica, silica, titanium oxide, zinc oxide, calcium silicate, metallic salts of fatty acids such as barium stearate, zinc stearate, aluminum stearate, etc.), wetting agents, fillers, pigments, flame retarding agents, plasticizers, heat stabilizers, peroxides, age resistors, and cross-linking agents.

The polyolefin foam antistatic composition for polyolefin foams consists of two parts: (1) a quatenary (quaternary) ammonium salt; and (2) a partial ester of a long-chain fatty acid with a polyol.

The quaternary ammonium salts and partial esters of a long-chain fatty acid with a polyol that comprise the antistatic additive composition found to produce this synergistic result in the practice of this invention are, but are not limited to, those generally found as commercial products.

The partial esters of long-chain fatty acids with polyols are generally used as stability control agents and are described in U.S. Pat. Nos. 4,694,027 and 3,644,230. For example, the general formula for a glycerol ester of a fatty acid is as follows: $RCOOCH_2CHOHCH_2OH$, with the R being a chain of alkyl groups containing from 4 to 22 carbon atoms. The fatty acids may be saturated, unsaturated or aromatic. Examples of these partial esters of long-chain fatty acids with polyols are glycerol monostearate and glycerol monolaurate. Particularly preferred are the partial esters of long-chain fatty acids with glycerol. Most preferred are glycerol monostearate and glycerol monobehenate.

Typically, in the present invention such partial esters are employed in an amount ranging from about 0.1 to about 10 parts per hundred based on the weight of the olefin polymer employed. Preferably they are employed in an amount ranging from about 0.1 to about 5 parts per hundred.

The quaternary ammonium salts are those antistatic compounds as generally defined in the literature with a cation of a central nitrogen atom joined to four organic groups and an anion of an acid radical. Examples include, but are not limited to octadecyldimethylbenzyl ammonium chloride, hexamethonium chloride, soya dimethyl ethyl ammonium ethylsulfate, soya dimethyl ethyl ammonium phosphate, soya dimethyl ethyl ammonium ethylphosphate, MARKSTAT AL-33 (by Argus Division of Witco Corp., New York, N.Y., USA), stearamidopropyldimethyl-B-hydroxyethylammonium nitrate (CYASTAT SN, from American Cyanamid Co., Wayne, N.J., USA), stearamidopropyl-dimethyl-B-hydroxyethylammonium dihydrogen phosphate (CYASTAT SP from American Cyanamid Co.), N,N-bis-(2-hydroxyethyl)-N-(3'-dodecyclocy-2'-hydroxypropyl) methylammonium methosulfate (CYASTAT 609 from American Cyanamid Co.), (3-laurylamidopropyl) trimethyl ammonium methyl sulfate (CYASTAT LS from American Cyanamid Co.). diisobutylphenoxyethoxyethyldimethylbenzylammonium chloride monohydrate, HEXCEL 106G, (from the Hexcel Corporation, Dublin, Calif., USA), stearyldimethylbenzyl ammonium chloride, LAROSTAT HTS 905, (available commercially from Mazer Chemicals Division, PPG Industries, Inc., Gurnee, Ill., USA), LAROSTAT 264-A (from Mazer Chemicals Division, PPG Industries, Inc.) and n-alkyl dimethylethyl ammonium ethyl sulfate in dipropylene glycol (LAROSTAT 377-DPG from Mazer Chemicals Division, PPG Industries, Inc.). Other useful antistatic compounds are described in U.S. Pat. No. 2,626,878. Antistatic agent generally described as aliphatic amidopropyl quaternary ammonium salts useful in the present invention are also disclosed and claimed in U.S. Pat. No. 2,589,674. Particularly preferred in the present invention are LAROSTAT HTS 905 and (3-laurylamidopropyl) trimethyl ammonium methyl sulfate.

Typically, in the present invention such quaternary ammonium salts are employed in an amount ranging from about 0.05 to about 10 parts per hundred based on the weight of the olefin polymer employed. Preferably they are employed in an amount ranging from about 0.05 to about 5 parts per hundred.

It is well known to prepare olefin polymer foams by heat plastifying a normally solid olefin polymer resin, admixing such heat plastified resin with a volatile blowing agent under heat and pressure to form a flowable gel and thereafter extruding the gel into a zone of lower pressure and temperature to activate the blowing agent and expand and cool the gel to form the desired solid olefin foam product.

Common known volatile blowing agents include, but are not limited to, 1,2-dichlorotetrafluoroethane, dichlorodifluoromethane, isobutane, and 1-chloro-1,1-difluoroethane, other chlorofluorocarbons, hydrofluorocarbons, hydrochlorofluorocarbons, hydrocarbons halogenated hydrocarbons, water or inert gases. The preferred volatile blowing agents are hydrofluorocarbons, hydrochlorofluorocarbons, hydrocarbons or halogenated hydrocarbons.

Also it is well known to prepare olefin polymer foams in much the same manner with chemical blowing agents which chemical blowing agents are usually later decomposed (activated) by heat to produce a gaseous product which then forms an olefin foam product.

A common known chemical blowing agent is azodicarbonamide.

A particular type of olefin foam product one which comprises a plurality of coalesced distinguishable expanded strands or profiles. U.S. Pat. Nos. 4,824,720 and 3,573,152 are incorporated by reference to show this type of product and how to produce this type of foam product. These foam products are prepared by extruding a foamable thermoplastic material through a multi-orefice die plate, whereby the individual foamable elements of the strand are formed, expanded and coalesced upon emerging from the die orifices.

Thermoplastic resins particularly preferred for this coalesced strand process are copolymers of ethylene and a copolymerizable polar monomer especially a carboxyl-containing comonomer. Most preferred are thermoplastic compositions are copolymers of ethylene and acrylic acid, (EAA copolymers) having up to about 30% by weight of copolymerized acrylic acid and their ionomeric derivatives. Moreover, additional components such as crosslinking agents designed either to provide latent crosslinking of the ethylenic polymer, such as silane functional crosslinking agents or covalent or ionic crosslinking agents, may be included if desired.

Blending of the various components in order to provide a suitable thermoplastic composition for melt extrusion to prepare the antistatic olefin foams of the present invention is accomplished according to known techniques in the art. Suitably, a mixer, extruder or other suitable blending device is employed to obtain a homogeneous melt. An extruder or any other suitable device is then employed to incorporate a known blowing agent any with additional agents.

A key concept and requirement of the present invention is that the quaternary ammonium salt must be added only after the thermoplastic resin has become a flowable gel. Generally the most expedient way, but not the only way, to make this happen is to either melt the quaternary ammonium salt or make a solution of the quaternary ammonium salt and inject it into the heat plastified flowable resin and then mix the salt and gel. Alcohols, particularly methanol, are useful in preparing the solutions of the quaternary ammonium salt. Also while the molten salt or salt in solution can be added anytime after the polyolefin resin is heat plastified, it is preferable to add the molten salt or salt in solution into the process at a point in the process where the temperature is lower than the initial temperature necessary to heat plastify the polyolefin resin and where the salt can be intimately mixed with the flowable gel. For example, in a tandem extrusion system, the molten salt or salt in solution could be added to the inlet side of the second extruder.

The densities of the antistatic foams of the present invention are not limited, but are preferably in the range of 0.5 to about 6.0 pounds per cubic foot (lbs/ft). The antistatic foams may have open or closed cells.

Antistatic polyolefin films of the present invention are also prepared using known methods of preparation, and the polyolefin resins and antistatic additive compositions described in this specification.

The static decay time test is conducted according to Federal Test method Standard 101C, Method 4046 (MIL-B-81705B requirements). In this test the sample receives a 5000 volt charge by two electrodes, which are grounded once the sample has been charged. The time for a sample to lose its original charge, as measured in seconds, is measured by an electrometer. The MIL-B-81705B requirements require the specimen to decay to zero percent of initial charge in not more than two seconds when using Method 4046 of Standard 101C. Surface resistivity is measured according to ASTM D257.

The following examples, in which all parts and percentages are on a weight basis unless otherwise indicated, are presented as illustrative of the present invention and are not to be understood as limiting its scope. Also in the examples which follow, the various quaternary ammonium compounds and comparative compounds which are used are, for convenience, identified by their commercial names, or abbreviations.

EXAMPLES

The following formulation is used to make a polyolefin foam in an extrusion process for the examples, unless otherwise noted.

20.0 pounds per hour of an ethylene/acrylic acid copolymer (3 acrylic acid percent by weight of copolymer) (EAA)

3.71 pounds per hour of HCFC-142b (1-chloro-1,1-difluoroethane)

0.06 pounds per hour of a nucleator (talc)

0.2 pounds per hour glycerol monostearate (GMS)

The ethylene/acrylic acid copolymer, nucleator and GMS are heat plastified into a flowable gel in an a 1½ inch (3.8 cm) screw type extruder. The temperatures of the flowable gel out of the extruder range from about 176 to about 192 degrees centigrade. The flowable gel is then passed to a piece of equipment which provides mixing and cooling capabilities prior to exiting the die. The temperatures of the flowable gel exiting the mixer/cooler equipment range from about 137 to about 143 degrees centigrade.

Tables 1 and 2 indicate the amount of the quaternary ammonium salt used in each example, based on resin weight. In Table 1 the quaternary ammonium salt as sold is in an unknown liquid carrier. This formulation is sold as LAROSTAT HTS 905. In Table 2 the quaternary ammonium salt is CYASTAT LS is in solution with 0.025 pounds per hour of methanol.

Samples of the foam are then prepared by aging the foam for three days at 10 percent relative humidity and a temperature of 75 degrees Fahrenheit for static decay testing and surface resistivity testing.

TABLE 1

LAROSTAT HTS 905 and 1 pph Glycerol Monostearate

| Amount of LAROSTAT HTS 905 (parts per hundred) | Static Decay (seconds) | Surface Resistivity (ohms/square) |
|---|---|---|
| 0.4 | 0.09 | $3.9 \cong 10^{12}$ |
| 0.8 | 0.07 | $5.2 \cong 10^{12}$ |
| 1.2 | 0.06 | $1.8 \cong 10^{12}$ |
| 1.6 | 0.05 | $8.4 \cong 10^{11}$ |

TABLE 2

CYASTAT LS and 1 pph Glycerol Monostearate

| Amount of CYASTAT LS (parts per hundred) | Static Decay (seconds) | Surface Resistivity (ohms/square) |
|---|---|---|
| 0.25 | 0.45 | $3.7 \cong 10^{13}$ |
| 0.50 | 0.26 | $3.0 \cong 10^{13}$ |
| 1.00 | 0.14 | $2.1 \cong 10^{14}$ |

As can be seen in Tables 1 and 2 the static decay time is well below 2 seconds, which is the minimum requirement for specimens under MIL-B-81705B.

COMPARATIVE EXAMPLES

In Table 3 the formulation of the examples was used, except, rather than using a quaternary ammonium salt, an amine (ethoxylated cocoamine) called VARSTAT K22 (from Sherex Chemical Co., Dublin, Ohio.) was used. In Table 4 the formulation of the examples was used except 0.2-0.6 pounds per hour of only GMS (1, 2 and 3 pph) was used.

TABLE 3

VARSTAT K22 and 1 pph Glycerol Monostearate

| Amount of VARSTAT K22 (parts per hundred) | Static Decay (seconds) | Surface Resistivity (ohms/square) |
|---|---|---|
| 0.4 | 0.6 | $2.5 \cong 10^{14}$ |
| 0.8 | 0.9 | $9.1 \cong 10^{14}$ |

TABLE 3-continued

VARSTAT K22 and 1 pph Glycerol Monostearate

| Amount of VARSTAT K22 (parts per hundred) | Static Decay (seconds) | Surface Resistivity (ohms/square) |
|---|---|---|
| 1.2 | 1.2 | $6.2 \cong 10^{14}$ |

As can be seen in Table 3 the static decay time has increased overall as compared to the examples and rather than decreasing with increasing amounts of ethoxylated amine, the static decay time appears to increase. Also the surface resistivity appears to have increased significantly when compared with the examples of Tables 1 and 2.

TABLE 4

Glycerol Monostearate

| Amount of Glycerol Monostearate (parts per hundred) | Static Decay (seconds) | Surface Resistivity (ohms/square) |
|---|---|---|
| 1 | 4.2 | $8.9 \cong 10^{14}$ |
| 2 | 2.2 | $9.6 \cong 10^{14}$ |
| 3 | 1.3 | $1.5 \cong 10^{14}$ |

Table 4 shows that GMS by itself has a static decay time that is significantly greater than the examples and at low levels does not function well as an antistatic agent.

ADDITIONAL FOAM EXAMPLE AND FOAM COMPARATIVE SINGLE ADDITIVE EXAMPLES

TABLE 5

Antistatic Composition versus Components

| Amount of LAROSTAT HTS 905 (parts per hundred) | Amount of Glycerol Monostearate (parts per hundred) | Static Decay (seconds) |
|---|---|---|
| 0.00* | 1.0 | 2.5 |
| 0.60* | 0.0 | Greater than 30 |
| 0.60 | 1.0 | 0.2 |

*Not examples of the present invention

Using the same basic formulation to prepare EAA foam as described in Tables 1-4, Table 5 shows that the use of both additives produces a much lower static decay time than either additive used singly.

FILM EXAMPLES AND FILM COMPARATIVE EXAMPLES

The following film examples and film comparative examples are made by blending the formulation for ten minutes at 50 revolutions per minute and 150 degrees centigrade. The resultant homogeneously mixed blend was then pressed into a thin film and tested for static decay. The polyolefin resin used, unless otherwise stated, is an ethylene/acrylic acid copolymer (3 percent acrylic acid by weight of the copolymer) (EAA). The additive weights are parts by weight based on the weight of the resin.

TABLE 6

LAROSTAT HTS 905 and 1 pph Glycerol Monostearate

| Amount of LAROSTAT HTS 905 (parts per hundred) | Static Decay (seconds) |
|---|---|
| 0.15 | 23.0 |

TABLE 6-continued

LAROSTAT HTS 905 and 1 pph Glycerol Monostearate

| Amount of LAROSTAT HTS 905 (parts per hundred) | Static Decay (seconds) |
|---|---|
| 0.20 | 2.49 |
| 0.40 | 1.54 |
| 0.50 | 2.7 |
| 0.60 | 0.83 |

TABLE 6A

LAROSTAT HTS 905 with no Glycerol Monostearate

| Amount of LAROSTAT HTS 905 (parts per hundred) | Static Decay (seconds) |
|---|---|
| 0.15 | 23.0 |
| 0.20 | Greater than 30 |
| 0.40 | Greater than 30 |
| 0.50 | 2.7 |
| 0.60 | 9.5 |
| 0.80 | 3.0 |
| 0.96 | 0.07 |
| 1.0 | 0.09 |
| 1.32 | 0.03 |
| 2.0 | 0.15 |

As can be seen in comparing Tables 6 and 6A (examples versus comparative examples) the static decay time is significantly reduced with the addition of as little as 1 part per hundred (pph) of GMS to a formulation having only 0.20 pph of the quaternary ammonium salt. As a comparison, it takes 0.50 pph of the quaternary ammonium salt alone to produce approximately the same static decay time.

TABLE 7

LAROSTAT HTS 905 and 1 pph Glycerol Monostearate

| Amount of LAROSTAT HTS 905 (parts per hundred) | Static Decay (seconds) |
|---|---|
| 0.50* | 0.35 |

*Resin - 80 pph polyethylene/20 pph EAA by total weight

TABLE 7A

LAROSTAT HTS 905 and 1 pph Glycerol Monostearate

| Amount of LAROSTAT HTS 905 (parts per hundred) | Static Decay (seconds) |
|---|---|
| 0.50* | Greater than 30 |

*Resin - polyethylene

TABLE 7B

LAROSTAT HTS 905 with no Glycerol Monostearate

| Amount of LAROSTAT HTS 905 (parts per hundred) | Static Decay (seconds) |
|---|---|
| 0.66* | Greater than 30 |
| 0.96* | Greater than 30 |
| 1.32* | Greater than 30 |

TABLE 7B-continued

LAROSTAT HTS 905 with no Glycerol Monostearate

| Amount of LAROSTAT HTS 905 (parts per hundred) | Static Decay (seconds) |
|---|---|
| | 30 |

*Resin - polyethylene

As can be seen in comparing comparative example Tables 7A and 7B with example Table 7, the addition of as little as twenty weight percent, based on total resin weight, of an ethylene/acrylic acid copolymer with three weight percent by copolymer weight acrylic acid functionality into a polyethylene resin (density of 0.923 grams/cubic centimeter and melt index of 2.1 grams/10 minutes) (PE) (thus providing 0.06 weight percent acrylic acid functionality in the PE/EAA resin blend total) provides a static decay time significantly less than two seconds, while the PE having the quaternary ammonium salt alone or in combination with GMS still provides an unacceptable static decay time.

TABLE 8

LAROSTAT HTS 905

| Amount of LAROSTAT HTS 905 (parts per hundred) | Static Decay (seconds) |
|---|---|
| 0.50* | 2.7 |
| 0.50** | 1.6 |

*1 pph Glycerol Monostearate
**1 pph Glycerol Monobehenate

TABLE 8A

LAROSTAT HTS 905

| Amount of LAROSTAT HTS 905 (parts per hundred) | Static Decay (seconds) |
|---|---|
| 0.50* | Greater than 30 |
| 0.50** | Greater than 30 |
| 0.50*** | Greater than 30 |
| 0.00**** | Greater than 30 |
| 0.00***** | Greater than 30 |

Includes:
*1 pph Ethylene Glycol Monostearate
**1 pph Glycerol Tristearate
***1 pph Stearyl Stearamide
****1 pph glycerol Monostearate
*****1 pph glycerol Monobehenate As can be seen in comparing the comparative examples of Table 8A with the example of Table 8, not all partial esters of a long chain fatty acid with a polyol appear to work with the same efficacy in the antistatic composition of the present invention. The preferred partial esters appear to be those which are a combination of glycerol and a single long chain fatty acid, such as for example glycerol monostearate.

The words CYASTAT, LAROSTAT, MARKSTAT, VARSTAT and HEXCEL used herein are trademarks.

While the subject matter of this specification has been described and illustrated by reference to certain specific embodiments and examples in this specification, these certain specific embodiments and examples should not in any way be interpreted as limiting the scope of the claimed invention.

What is claimed is:

1. An antistatic composition comprising:
   (a) at least one quaternary ammonium salt; and (b) at least one partial ester of a long chain fatty acid with a polyol which antistatic composition when incorporated into a polyolefin resin has a static decay time faster than either (a) or (b) when used alone at the same amount as is present in the antistatic composition.

2. The antistatic composition of claim 1. wherein the antistatic composition has 0.1 to about 10 parts per hundred by weight of a partial ester of a long-chain fatty acid with a polyol and 0.05 to 10 parts per hundred of a quaternary ammonium salt based on the total weight of the antistatic composition.

3. The antistatic composition of claim 2. wherein the quaternary ammonium salt is either in a liquid state or in a solution immediately prior to usage.

4. The antistatic composition of claim 3. wherein the quaternary ammonium salt is in a solution with an alcohol prior to usage.

5. The antistatic composition of claim 4. wherein the alcohol is methanol.

6. A polyolefin film comprising:
(a) a polyolefin resin; and
(b) an antistatic composition having two components (1) at least one quaternary ammonium salt and (2) at least one partial ester of a long chain fatty acid with a polyol;

which polyolefin film has a static decay time which is faster than a polyolefin film containing no antistatic composition or a polyolefin film containing only one of the two components.

* * * * *